Patented Mar. 25, 1924.

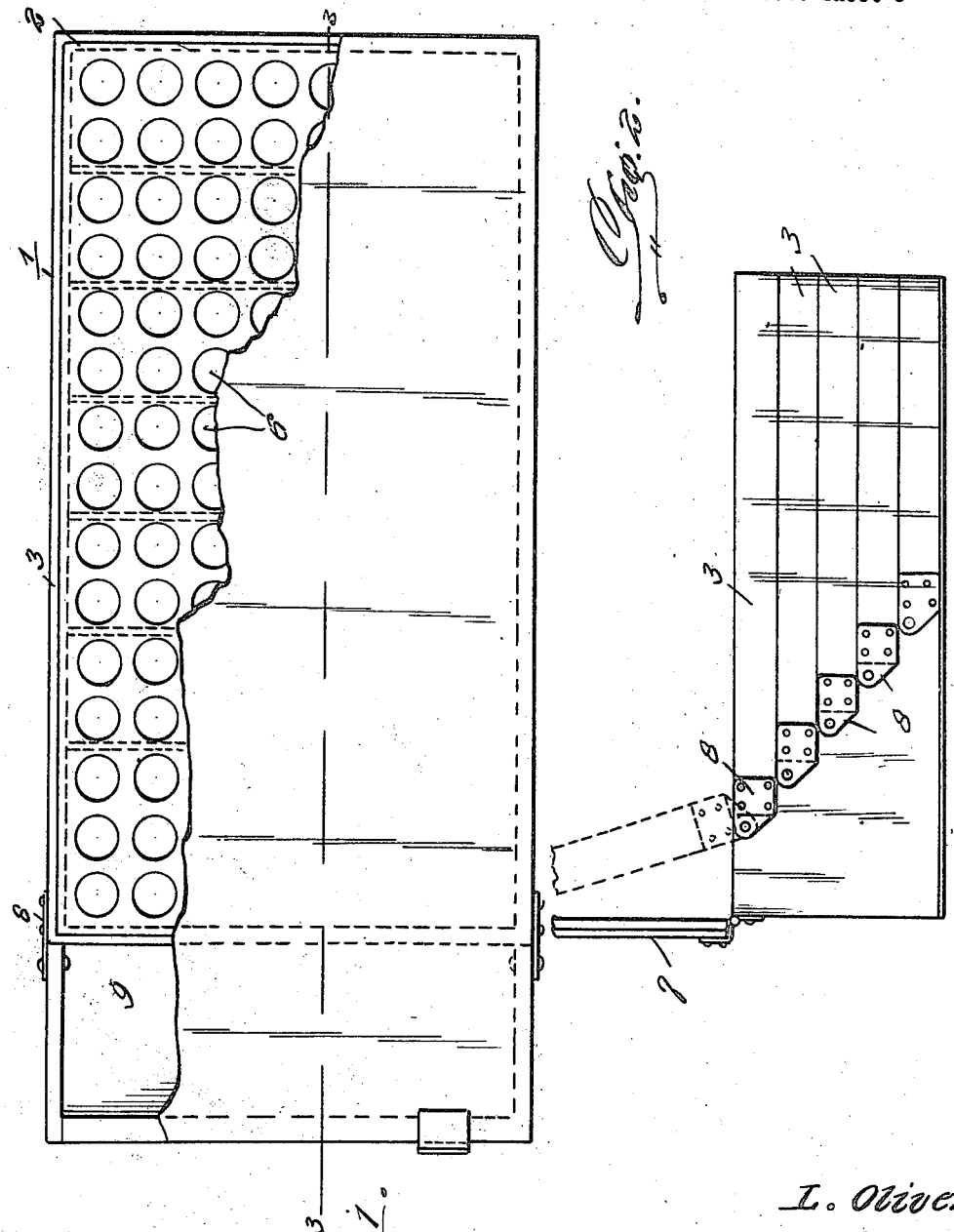

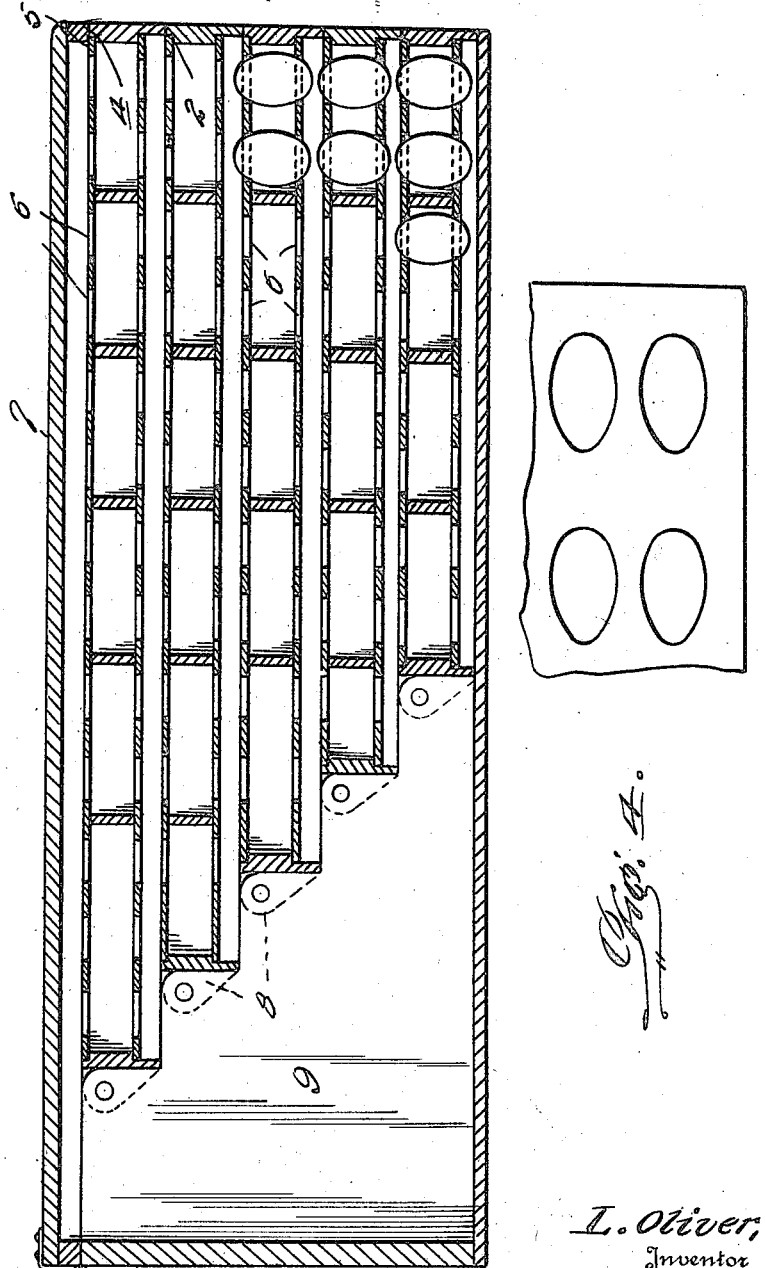

1,487,878

UNITED STATES PATENT OFFICE.

LAVAN OLIVER, OF EAST VAUGHN, NEW MEXICO, ASSIGNOR OF ONE-HALF TO LAWRENCE F. FURLOW, OF EAST VAUGHN, NEW MEXICO.

EGG CRATE.

Application filed May 11, 1923. Serial No. 638,157.

*To all whom it may concern:*

Be it known that I, LAVAN OLIVER, a citizen of the United States, residing at East Vaughn, in the county of Guadalupe and State of New Mexico, have invented certain new and useful Improvements in Egg Crates, of which the following is a specification.

This invention has reference to egg carriers or crates and its object is to provide a container for eggs by means of which they may be shipped from place to place in safety and may be readily removed as needed.

In accordance with the invention there is provided a case or container in which the eggs may be assembled in layers for ready access and will be supported in such manner as to prevent breakage.

The containers are supported in superposed layers so that a large number of eggs may be lodged in one crate with the eggs supported on end or side as the case may be and yet the eggs may be readily accessible as needed with the eggs protected from contact with each other and may be readily packed in dozens or other multiples for ready access and shipment.

In accordance with the invention, there is provided a casing of appropriate size supplied with an appropriate number of individual containers all assembled in a suitable casing in which the containers are accessible by being supported hingedly in superposed order so that each container is reached by lifting the superposed containers about the hinge supports to reach the next lower containers with the lowermost one of the containers unprovided with hinges.

The entire assemblage of egg crates or containers is lodged in a casing located in a box or support and furnished with a covered member having a hinged top so that ready access may be provided and the casing may be closed and sealed or locked to prevent unauthorized access thereto.

The crate is constructed as many sections deep as needed and each section is furnished with egg crates for supporting the eggs without liability of contact and consequent damage.

The casing is arranged to contain as many eggs as desired, leaving extra space for other commodities than eggs.

The egg crates are conveniently constructed to contain a minimum or maximum number of eggs distributed in suitable units for convenience of transportation.

The invention will be best understood from a consideration of the following detail description in connection with the accompanying drawings with the understanding that the invention is not confined to any strict conformity with the showing of the drawings but such detail structure may be changed and modified so long as such changes and modifications mark no material departure from the several features of the invention as expressed in the appended claims.

In the drawings:

Figure 1 is a plan view of the improved egg crate with some parts broken away to show the interior structure;

Figure 2 is a side elevation of a portion;

Figure 3 is a longitudinal vertical section of the egg crate; and

Figure 4 is a detail view of the modification of the structure.

In the drawings, there is shown a casing 1 usually of a tubular or rectangular formation and made up of a superposed series of egg crates 2 in stepped formation or assemblage, each crate comprising a frame 3, each crate being of greater superficial area than the next lower one.

Each crate comprises a rectangular frame formed of a marginal member having a rabbet 4 in which is seated a fibrous frame 5 provided with a series of punched-out apertures 6 to receive the ends of sides of the eggs so as to support them by the ends or sides only, free from contact with each other, such arrangement being best shown in Figure 3.

The body portions of the frames 3 are preferably made of wooden strips while the egg supporting parts are made of cardboard, providing ample space for the purpose of the invention, the wooden frames providing ample strength and rigidity to carry the eggs while the exterior members 1 are sufficient to stiffen the egg case. The cover 7 is made amply rigid to prevent injury to the casing and the eggs.

The several frames 3 are each supported on the next lower one in order by means of hinged connections 8 located at one end while the other end of each frame is seated in the next underlying frame to permit each higher frame being lifted about its hinge 8 when access to the eggs is desired.

The cover 7 is hinged to the casing 1 at one end which constitute the complete casing while the crate frames 3 are each connected to the next lower one in order by the hinges 8 with the card board crates 2 lodged in the frames 3.

When the superposed egg crates are assembled within the casing 1 the corresponding ends of the crates are all located at one end of the casing with the other ends of the crates in stepped relation, leaving a space 9 at one end of the casing for receiving different commodities which may be shipped with the eggs, such, for instance, as butter and the like.

By the arrangement provided by this invention provision is made for a large number of eggs in spaced relation so that the eggs are each individually supported without liability of contact and with each egg elastically supported from contact with other eggs and carried by the ends or sides only whereby shocks and jars incident to shipment are prevented from being transmitted to the eggs to damage them.

Besides supporting the eggs on end or side portions only in elastic supports provision is made for preventing direct contact to the eggs with each other and provision is also made for conserving space within the crate for containing other commodities than eggs without liability of damage to any of the contents of the crate.

What is claimed is:

1. An egg crate or carrier comprising a casing having within it a superposed series of egg containers of gradual increasing length from one end to the other and provided with perforations for supporting the eggs at end portions thereof out of contact with each other.

2. An egg crate or carrier provided with elongated perforated egg supports disposed in horizontal planes in superposed order with the egg crates or carriers, each hingedly supported at one end and of constantly increasing length from one end toward the other.

3. An egg crate or carrier comprising an elongated series of individual supports of increasing length from one end toward the other provided with perforated egg carriers of elastic material with the perforations matching.

4. An egg crate or carrier comprising a rectangular casing with a superposed series of elongated carriers with the elongation increasing from below upwardly, the casing being of rectangular outline with the crates increasing in length within the casing lengthwise thereof in rising order.

In testimony whereof I affix my signature.

LAVAN OLIVER.